United States Patent
Deutscher et al.

(10) Patent No.: US 9,742,906 B2
(45) Date of Patent: Aug. 22, 2017

(54) METHOD AND DEVICE FOR TESTING IN A DSL ENVIRONMENT

(71) Applicant: ADTRAN, GmbH, Munich (DE)

(72) Inventors: Jan Deutscher, Greifswald (DE); Tim Eickelberg, Greifswald (DE); Nils Asmussen, Berlin (DE)

(73) Assignee: Adtran GmbH, Berlin (DE)

( * ) Notice: Subject to any disclaimer, the term of this patent is extended or adjusted under 35 U.S.C. 154(b) by 0 days.

(21) Appl. No.: 15/336,888

(22) Filed: Oct. 28, 2016

(65) Prior Publication Data
US 2017/0126882 A1 May 4, 2017

(30) Foreign Application Priority Data
Nov. 4, 2015 (EP) .................... 15193015

(51) Int. Cl.
| H04M 1/24 | (2006.01) |
| H04M 3/08 | (2006.01) |
| H04M 3/22 | (2006.01) |
| H04M 3/30 | (2006.01) |

(52) U.S. Cl.
CPC ......... H04M 3/2209 (2013.01); H04M 3/306 (2013.01)

(58) Field of Classification Search
CPC .... H04M 3/085; H04M 3/305; H04M 11/062; H04L 12/2697; H04L 12/2867; H04L 12/2881; H04L 12/289; H04L 12/2892; H04L 12/2896; H04L 12/4641; H04L 43/50; H04B 3/46
USPC .......... 379/1.01, 1.04, 8, 9, 9.06, 10.01, 12, 379/15.01, 22, 22.02, 22.04, 24, 27.01, 379/29.09, 29.11, 26.01
See application file for complete search history.

(56) References Cited

U.S. PATENT DOCUMENTS

| 5,699,402 A * | 12/1997 | Bauer | H04M 3/085 379/14 |
| 5,937,033 A * | 8/1999 | Bellows | H04M 3/30 324/522 |
| 6,233,312 B1 * | 5/2001 | Chaskell | G01R 31/021 379/12 |
| 7,733,790 B2 * | 6/2010 | Storry | H04L 12/2881 370/244 |
| 7,787,386 B1 * | 8/2010 | Marshall | H04L 12/2697 370/244 |
| 2005/0135567 A1 * | 6/2005 | Faulkner | H04B 3/48 379/22.07 |
| 2006/0193444 A1 * | 8/2006 | Aufenast | H04M 3/247 379/22 |
| 2015/0334225 A1 * | 11/2015 | Bull | H04B 3/46 379/22.07 |

* cited by examiner

*Primary Examiner* — Binh Tieu
(74) *Attorney, Agent, or Firm* — Fish & Richardson P.C.

(57) ABSTRACT

A method, system, computer program product, and a device for testing are provided. In some implementations, a method includes the steps of (i) conducting a line test on a line of a line card that is not connected to a subscriber line; (ii) comparing the result of the test with a predetermined result; and (iii) determining a defect of the test hardware if the result deviates from the predetermined result. Furthermore, a device and a communication system comprising said device are suggested.

19 Claims, 3 Drawing Sheets

METHOD AND DEVICE FOR TESTING IN A DSL ENVIRONMENT

CROSS-REFERENCE TO RELATED APPLICATIONS

This application claims priority under 35 U.S.C. §119 to European Patent Application Number 15193015.3 filed on Nov. 4, 2015, which is incorporated in its entirety herein.

BACKGROUND

This document relates to a method and to a device for conducting a test in a DSL environment.

Digital Subscriber Line Access Multiplexer (DSLAMs) and/or Multi Service Access Nodes (MSANs) are used to provide broadband access to subscribers via DSL line cards. In addition, means are required for testing the subscriber line. Such a subscriber line test in a DSL environment is often referred to as Metallic Line Test (MELT). A MELT may comprise several test stages. In an exemplary scenario, results of all test stages may be reported at the end of the entire test. Results may comprise: a foreign DC voltage, a foreign AC voltage, a capacitance, a resistance or the like.

The MELT is often realized as an integrated line test. In particular a MELT chipset may be provided that comprises several components, each component dedicated to a group of connections to several subscribers (i.e. several channels).

SUMMARY

The subject matter described in this document includes methods, systems, and devices that are used to conduct tests in a DSL environment. The tests conducted include tests that are used to determine whether a subscriber line has been disturbed. There are many possibilities for a subscriber line being disturbed: A lightning or (any other) overvoltage may damage the MELT unit, e.g., the MELT chipset. This may affect a multitude of ports, i.e. said group of connections for which this MELT unit is used.

It is in particular a problem that although the MELT unit is damaged and does not work properly, such damage may remain undetected by the DSLAM or MSAN. For example, the damaged MELT unit may return wrong results leading the network operator to wrong conclusions about the fault status of the subscriber line itself. In one scenario, the network operator may send a technician to locate and repair a line fault, which does not exist. Instead, the MELT unit at the DSLAM or MSAN is damaged. Such a fault may be difficult to detect and it may inflict a significant amount of costs and delay before the error can be successfully located and fixed.

This problem is solved according to the features discussed in this document. In some implementations, the problem can be overcome using a method for testing that includes conducting a line test on a channel of a line card that is not connected to a subscriber line; comparing the result of the test with a predetermined result; and determining a defect of the test hardware if the result deviates from the predetermined result.

This method for testing may in particular be a method for testing a DSL component or a portion of a DSL component, in particular at least one channel of a line card.

It is noted that any deviation from the predetermined result may comprise a deviation larger than a preset threshold. In this regard, the result of the test does not have to be identical with the predetermined result, it is sufficient if the result and the predetermined result do not deviate by (the threshold or) more than such threshold.

The line card can be a discrete component, which may be arranged as a plugin unit. As an alternative, a single board system comprising a central unit as well as embedded line cards can be provided.

Methods can also include determining no defect of the test hardware if the result does not deviate from the predetermined result.

In some implementations, the predetermined result is based on at least one previous line test.

It is an option that the first test (or a couple of initial tests) are used to determine the predetermined result that is used for the comparison. The initial test may be conducted before the MELT hardware becomes productive. The initial test results may be stored in a memory, e.g., a EEPROM. Hence, an actual MELT produces results that may be compared with test results that were stored during a time when the MELT hardware was verified to work properly.

In some implementations, the test is a metallic line test.

Methods can also include conducting a predetermined action in case the defect is detected.

In some implementations, the predetermined action can include at least one of the following: initiating a notification or an alarm; stopping further tests; not starting further tests; indicating that the test hardware is defective; or triggering a replacement or a repair order for the defective hardware.

In some implementations, the channel of the line card is an open line.

In some implementations, the channel is connected to a reference circuit.

In some implementations, the reference circuit can include at least one capacitor and at least one resistor, which determine an RC-circuitry.

In some implementations, the RC-circuitry simulate a behavior of a subscriber line and/or an onboard component of the line card.

In some implementations, a sanity check of the hardware is conducted, wherein the hardware is arranged to perform the line tests of the line card.

The problem can also be addressed using a device that includes a test hardware, at least one line card, wherein the test hardware is arranged to conduct a line test on a channel of a line card that is not connected to a subscriber line; and a processing unit, wherein the processing unit is arranged to compare the result of the test with a predetermined result; and determine a defect of the test hardware if the result deviates from the predetermined result.

The device may be a CO, a DSLAM or a MSAN. It is noted that the steps of the method stated herein may be executable on this processing unit as well. It is further noted that said processing unit can include at least one, in particular several means that are arranged to execute the steps of the method described herein. The means may be logically or physically separated; in particular several logically separate means could be combined in at least one physical unit.

Said processing unit may include at least one of the following: a processor, a microcontroller, a hard-wired circuit, an ASIC, a FPGA, a logic device.

In some implementations, the processing unit is part of the line card, part of the test hardware or an external component.

In some implementations, the test hardware is a MELT hardware, which is at least partially arranged on the at least one line card.

In some implementations, the test hardware comprises a master test hardware and at least one slave test hardware, wherein the master test hardware is arranged centrally for the at least one line card and the at least one slave test hardware is arranged with the at least one line card.

In some implementations, a device is suggested, the device comprising processing unit that is arranged such that the method as described herein is executable thereon.

Further, a communication system can be provided and includes the device as described herein.

Also, a computer program product is suggested, which is directly loadable into a memory of a digital processing device, comprising software code portions for performing the steps of the method as described herein.

In addition, the problem stated above can be solved by a computer-readable medium, e.g., storage of any kind, having computer-executable instructions adapted to cause a computer system to perform the method as described herein.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Examples provided herein allow a detection of MELT hardware defects in a cost-efficient way. To achieve this, periodic self-tests (measurements) via at least one reference channel are initiated. The reference channel may in particular comprise a channel that is not used, i.e. not connected to a subscriber.

The MELT hardware may be subject to sanity checks. A sanity check may be triggered at a given time schedule, e.g., at predefined time intervals, at predefined times and/or at predefined events. The sanity check may comprise a software and/or a firmware that is run on the MELT hardware to check whether some portions of the hardware are still operational. However, the sanity check may not be able to check correct operation of all portions of the hardware.

In addition to the sanity checks, real measurements are conducted via a reference channel that may comprise a reference circuit. The reference channel may comprise a known characteristics, which should reveal similar measurement results based on these characteristics. Hence, if the MELT hardware is damaged, the result of the test conducted on the reference channel is significantly different from what it is expected to be; such discrepancy can be used to determine that the error is within the MELT hardware not in the subscriber line or at the customer's premises.

As an option, the characteristics of the reference channel may be changed in a predefined manner. Hence, also the change of the characteristics is known and can be the basis to assess the measurement results and hence the health of the MELT hardware.

Figure 1:
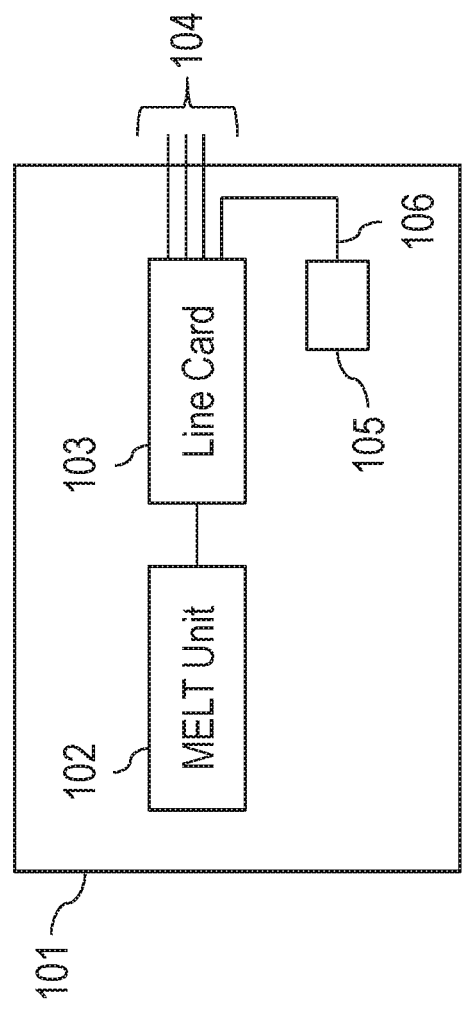
FIG. 1 shows a diagram of an example system including a DSLAM or MSAN, a MELT unit, a line card, a reference circuit and a reference channel.

FIG. 1 shows a diagram that includes a DSLAM or MSAN 101 (hereinafter referred to as DSLAM), a MELT unit 102, a line card 103, a reference circuit 105 and a reference channel 106. The line card 103 comprises several ports, wherein one of the ports is not connected to a subscriber line, but to the reference circuit 105. The remaining ports of the line card 103 are connected to subscriber lines 104.

It is noted that the DSLAM or MSAN or any unit comprising at least one central unit of this kind can be referred to as Central Office (CO).

It is further noted that the arrangement of FIG. 1 can be realized in various ways. For example, the MELT unit may be part of the line card. Also, the DSLAM may comprise a multitude of line cards, each of the line cards comprising at least one MELT unit. Further, a centralized MELT unit may be arranged for several line cards. It is also an option that at least one reference channel (i.e. a port not connected to the subscriber line, but to the reference circuit instead) is provided per line card or per MELT unit (in particular if the MELT unit is arranged on the line card). It is in particular beneficial to have at least on reference channel per MELT hardware so that a damaged MELT hardware can be identified due to a real measurement.

In some implementations, a single reference channel 106 per MELT unit 102 is not connected to a subscriber line 104, but to the reference circuit 105. The reference circuit 105 may comprise a circuitry with at least one resistor and at least one capacitor, which build a so-called RC circuitry. The RC circuitry may in particular be set up such that it simulates the behavior of an actual subscriber line. As an option, the RC circuitry may simulate the onboard-components of the line card to the point where the subscriber line is connected.

Hence, the reference circuit 105 has a predefined characteristics, which is (substantially) independent from external effects that may apply on any real-world subscriber line 104. Also, the RC circuitry provides for substantially repeatable measurement results if the MELT is applied on the reference channel 106. In other words, the MELT unit 102 is used to conduct a real MELT on the reference channel 106, which—according to the RC circuitry—simulates a particular line, board or port characteristics. This line characteristics is substantially fixed and the MELT should therefore produce comparable results from one measurement to the next. Hence, the MELT results for the reference channel are substantially the same (i.e. stay within a predefined range) if the MELT hardware is working correctly. If the MELT results between separate tests deviate by more than a predetermined threshold, this deviation may be used to indicate that the MELT hardware is defective.

It is noted that the reference channel 106 and the reference circuit 105 may be part of the line card 101.

Figure 2:
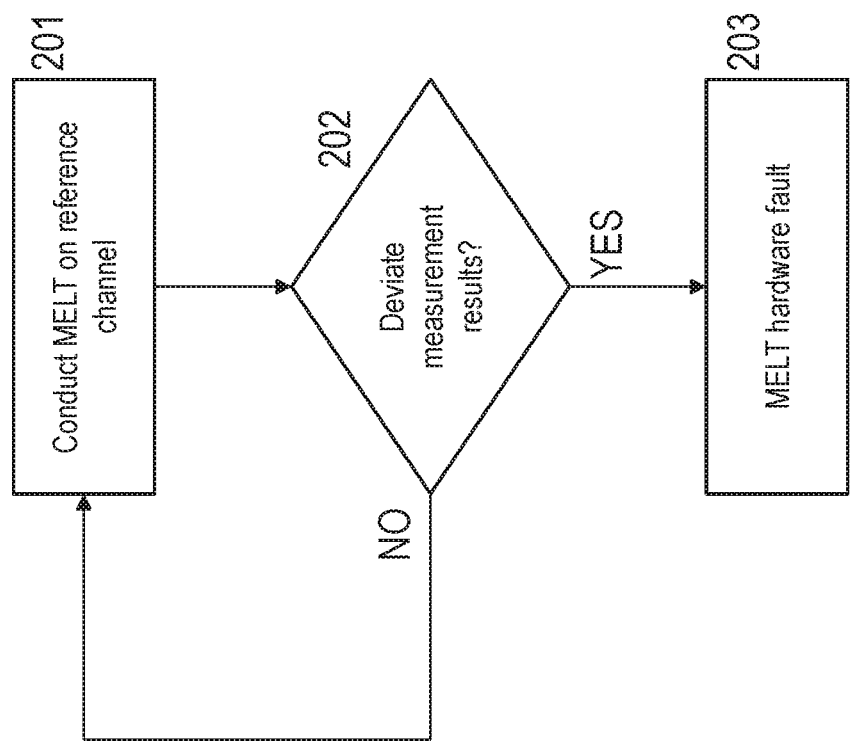
FIG. 2 shows diagram of example steps to determine whether the MELT hardware has a defect.

FIG. 2 shows a diagram of example steps to determine whether the MELT hardware has a defect. During field operation the reference channel 106 is monitored by MELTs (step 201). In a step 202 it is determined whether the measurement results of the MELT deviate, in particular whether the MELT results are in an expected range. If a significant deviation is detected on this reference channel 106 between current test results and the expected test results (e.g. previous test results or previously stored test results), a MELT hardware fault can be detected (step 203). Such hardware fault may be reported as an alarm to inform the network operator. Hence, the defective hardware can be replaced in a time and cost efficient manner. If step 202 does not indicate any such deviation, the MELT hardware is assumed to work correctly and it is branched to step 201.

It is an option to store first MELT results conducted on the reference channel during a manufacturing process in an environment where the correct operation of the MELT hardware is verified. Such results may be stored in a memory, e.g., EEPROM, and said discrepancy can be determined by comparing later MELT results with these previously stored MELT results.

Figure 3:
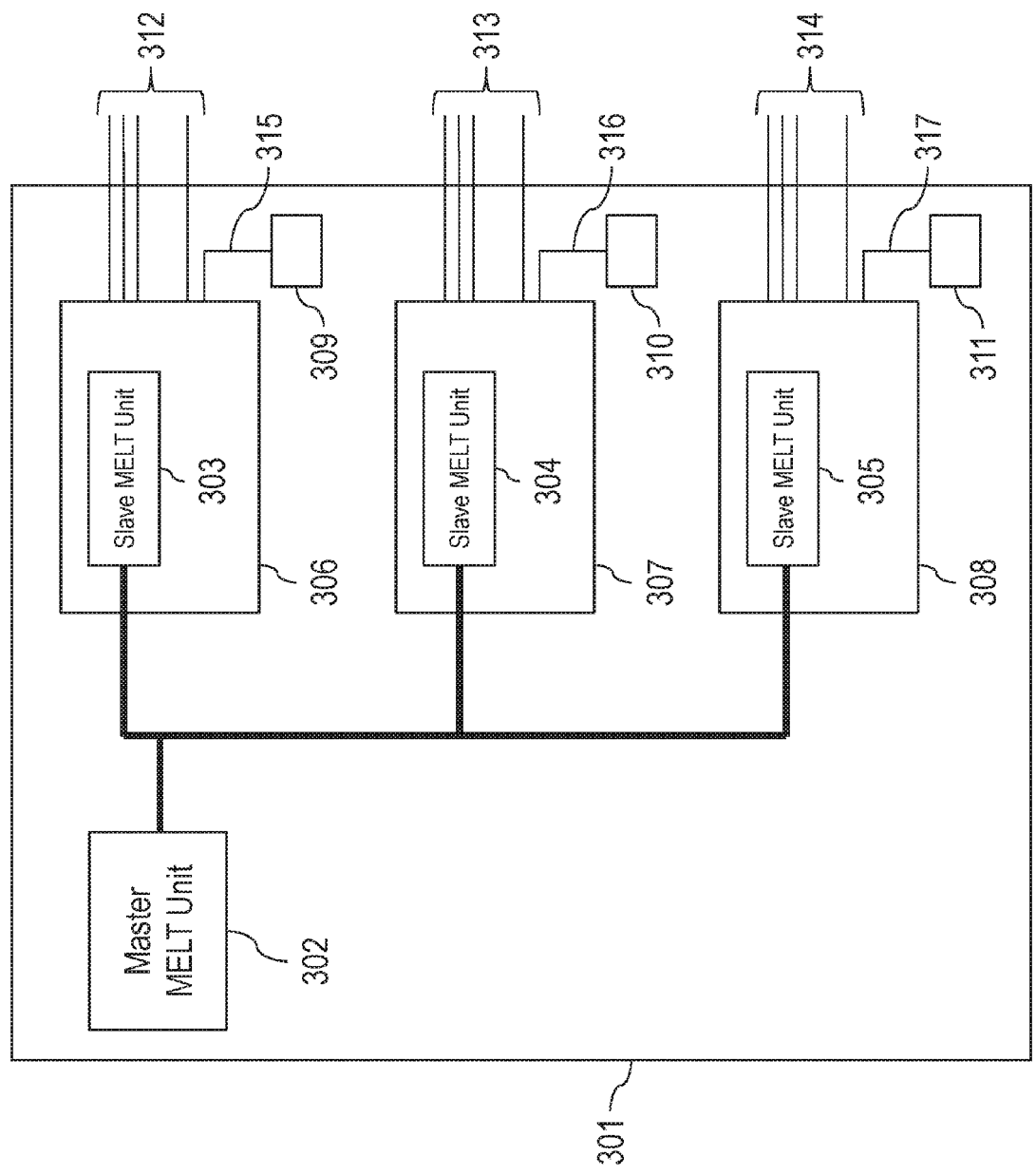
FIG. 3 shows an example arrangement of a Central Office (e.g., a DSLAM or MSAN) that includes three line cards, each of the line cards providing 16 subscriber lines.

FIG. 3 shows an example arrangement of a Central Office 301 (e.g., a DSLAM or MSAN) comprising three line cards 306 to 308, each of the line cards providing 16 subscriber lines 312, 313 and 314. Hence, the CO supplies 48 channels to customer premises equipments.

FIG. 3 also shows a distributed MELT hardware comprising a MELT master unit 302, which is connected to three MELT slave units 303, 304 and 305. Each MELT slave unit 303 to 305 is arranged on a line card 306 to 308.

Each line card has a single channel that is not connected to a subscriber line, but acts as a reference channel. The port may be open, i.e., not connected at all, or it may be connected to a reference circuit. This is shown in FIG. 3, where each line card 306 to 308 has a port connected to a reference channel 315 to 317, which is connected to a reference circuit 309 to 311.

Accordingly, other approaches with a different number of line cards, distributed or non-distributed MELT hardware and/or one or more reference channels may be used accordingly.

If the MELT hardware fault is detected, it is an option to deny conducting further tests for this presumably defective MELT hardware to avoid producing any defective test results.

It is also an option that instead of the RC circuitry an open channel can be used as reference channel. In such scenario, the reference channel is a channel not connected to either the reference circuit or any subscriber line.

It is an option that the MELT hardware may be realized as a multi-stage chipset, i.e. a chipset comprising several stages. At least one stage may be part of the master MELT unit and at least one additional stage may be part of the slave MELT unit. In this regard, the unit may refer to a stage of the multi-stage MELT hardware.

With regard to FIG. 3 it is also an option that the master MELT unit 302 may be distributed across the line cards 306 to 308, i.e. each line card 306 to 308 in this case comprises a master MELT unit and the slave MELT unit 303 to 305. Such master MELT units located on the line cards may communicate with each other via a bus system. As an alternative, the master MELT units may not be connected with each other.

This approach bears the advantage that an actual measurement fault conducted by a damaged MELT hardware can be determined. This is not restricted to a sanity check of some software portion running on the MELT hardware, it assesses the results provided by the MELT hardware.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to tangible computer-readable storage media which is non-transitory or a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

LIST OF ABBREVIATIONS

API Application Programming Interface
CO Central Office
DSL Digital Subscriber Line
DSLAM DSL Access Multiplexer
MELT Metallic Line Test
MSAN Multi Service Access Node

The invention claimed is:

1. A method for testing comprising:
   conducting, by test hardware of a line card, an initial line test on a channel of the line card that is not connected to a subscriber line;
   storing, in a memory, a first result of the initial line test as a predetermined test result for the line test of the channel; and
   at a time after the initial line test was conducted:
     conducting, by the test hardware, a subsequent line test on the channel of the line card that is not connected to the subscriber line, wherein at least one different channel of the line card is connected to the subscriber line while conducting the subsequent line test on the channel of the line card that is not connected to the subscriber line;
     comparing a second result of the subsequent line test with the predetermined test result of the initial line test; and
     determining that a defect of the test hardware exists when the second result deviates from the predetermined test result by more than a predetermined threshold.

2. The method according to claim 1, comprising:
   determining that no defect of the test hardware exists when the second result does not deviate from the predetermined test result by more than the predetermined threshold.

3. The method according to claim 1, wherein the subsequent line test is a metallic line test.

4. The method according to claim 1, further comprising:
   conducting a predetermined action when the defect is detected.

5. The method according to claim 4, wherein the predetermined action comprises at least one of the following:
   initiating a notification or an alarm;
   stopping further tests;
   not starting further tests;
   indicating that the test hardware is defective; or
   triggering a replacement or a repair order for the test hardware.

6. The method according to claim 1, wherein the channel of the line card is an open line.

7. The method according to claim 1, wherein the channel is connected to a reference circuit.

8. The method according to claim 7, wherein the reference circuit comprises at least one capacitor and at least one resistor, which define an RC-circuitry.

9. The method according to claim 8, wherein the RC-circuitry simulates a behavior of a subscriber line and/or an onboard component of the line card.

10. The method according to claim 1, wherein a sanity check of hardware is conducted, wherein the hardware is arranged to perform the subsequent line test of the line card.

11. A device comprising
    a test hardware,
    at least one line card,
    wherein the test hardware is arranged to conduct an initial line test on a channel of a line card that is not connected to a subscriber line, and conduct a subsequent line test on the channel of the line card that is not connected to the subscriber line at a time after the initial line test was conducted, wherein at least one different channel of the line card is connected to the subscriber line while conducting the subsequent line test on the channel of the line card that is not connected to the subscriber line; and
    a processing unit, wherein the processing unit is arranged to
      store, in a memory, a first result of the initial line test as a predetermined test result for the line test of the channel;
      compare a second result of the subsequent line test with the predetermined test result of the initial line test; and
      determine that a defect of the test hardware exists when the second result deviates from the predetermined test result by more than a predetermined threshold.

12. The device according to claim 11, wherein the processing unit is part of the line card, part of the test hardware or an external component.

13. The device according to claim 11, wherein the test hardware is a MELT hardware, which is at least partially arranged on the at least one line card.

14. The device according to claim 11, wherein the test hardware comprises a master test hardware and at least one slave test hardware, wherein the master test hardware is arranged centrally for the at least one line card and the at least one slave test hardware is arranged with the at least one line card.

15. A device comprising:
    a memory; and
    a processing unit that is arranged to perform operations including:
      conducting, by test hardware of a line card, an initial line test on a channel of the line card that is not connected to a subscriber line;
      storing, in the memory, a first result of the initial line test as a predetermined test result for the line test of the channel; and
      at a time after the initial line test was conducted:
        conducting, by the test hardware, a subsequent line test on the channel of the line card that is not connected to the subscriber line, wherein at least one different channel of the line card is connected to the subscriber line while conducting the subsequent line test on the channel of the line card that is not connected to the subscriber line;
        comparing a second result of the subsequent line test with the predetermined test result of the initial line test; and
        determining that a defect of the test hardware exists when the second result deviates from the predetermined test result by more than a predetermined threshold.

16. The device of claim 15, wherein the processing unit is arranged to perform operations comprising:
- determining that no defect of the test hardware exists when the second result does not deviate from the predetermined test result by more than a predetermined threshold.

17. The device of claim 15, wherein the processing unit is arranged to perform operations comprising:
- conducting a predetermined action when the defect is detected, wherein the predetermined action comprises at least one of initiating a notification or an alarm; stopping further tests; not starting further tests; indicating that the test hardware is defective; or triggering a replacement or a repair order for the test hardware.

18. A non-transitory computer program product storing software code portions that are directly loadable into a memory of a digital processing device, wherein execution of the software code portions causes the digital processing device to perform operations comprising:
- conducting, by test hardware of a line card, an initial line test on a channel of the line card that is not connected to a subscriber line;
- storing, in the memory, a first result of the initial line test as a predetermined test result for the line test of the channel; and
- at a time after the initial line test was conducted:
- conducting, by the test hardware, a subsequent line test on the channel of the line card that is not connected to the subscriber line, wherein at least one different channel of the line card is connected to the subscriber line while conducting the subsequent line test on the channel of the line card that is not connected to the subscriber line;
- comparing a second result of the subsequent line test with the predetermined test result of the initial line test; and
- determining that a defect of the test hardware exists when the second result deviates from the predetermined test result by more than a predetermined threshold.

19. The non-transitory computer program product of claim 18, wherein the processing unit is arranged to perform operations comprising:
- conducting a predetermined action when the defect is detected, wherein the predetermined action comprises at least one of initiating a notification or an alarm; stopping further tests; not starting further tests; indicating that the test hardware is defective; or triggering a replacement or a repair order for the test hardware.

* * * * *